US010370586B2

(12) United States Patent
Fitzgerald et al.

(10) Patent No.: US 10,370,586 B2
(45) Date of Patent: Aug. 6, 2019

(54) PROPPANT

(71) Applicant: BASF SE, Ludwigshafen (DE)

(72) Inventors: Shawn Fitzgerald, Belleville, MI (US); Christopher M. Tanguay, Trenton, MI (US); Timothy D. Klots, Plymouth, MI (US)

(73) Assignee: BASF SE, Ludwigshafen am Rhein (DE)

( * ) Notice: Subject to any disclaimer, the term of this patent is extended or adjusted under 35 U.S.C. 154(b) by 0 days.

(21) Appl. No.: 14/774,408

(22) PCT Filed: Mar. 11, 2014

(86) PCT No.: PCT/US2014/023270
§ 371 (c)(1),
(2) Date: Sep. 10, 2015

(87) PCT Pub. No.: WO2014/150440
PCT Pub. Date: Sep. 25, 2014

(65) Prior Publication Data

US 2016/0032178 A1 Feb. 4, 2016

Related U.S. Application Data

(60) Provisional application No. 61/792,116, filed on Mar. 15, 2013.

(51) Int. Cl.
*C09K 8/80* (2006.01)
*C09K 8/62* (2006.01)

(52) U.S. Cl.
CPC ................ *C09K 8/805* (2013.01); *C09K 8/62* (2013.01)

(58) Field of Classification Search
None
See application file for complete search history.

(56) References Cited

U.S. PATENT DOCUMENTS 3,585,167 A * 6/1971 Naarmann et al. .... C08G 18/00 524/315
4,247,666 A * 1/1981 Mochizuki ......... C08G 18/7642 525/124
4,532,052 A 7/1985 Weaver et al.
4,920,192 A * 4/1990 Wiser-Halladay .......................... C08G 18/0852 166/281
5,115,072 A 5/1992 Nava et al.
5,180,782 A 1/1993 Stone et al.
6,476,170 B1 11/2002 Roth et al.
7,270,879 B2 9/2007 McCrary
7,845,409 B2 12/2010 Shinbach et al.
2004/0162392 A1 9/2004 Kaai et al.
2005/0287484 A1 12/2005 Yano et al.
2007/0114030 A1 5/2007 Todd et al.
2007/0144736 A1 6/2007 Shinbach et al.
2007/0181302 A1 8/2007 Bicerano
2009/0095472 A1 4/2009 Andersson et al.
2009/0139719 A1 6/2009 Luo et al.
2010/0065271 A1* 3/2010 McCrary ................ C09K 8/805 166/278
2011/0297383 A1 12/2011 Tanguay et al.
2014/0060833 A1 3/2014 Kuhlmann et al.
2014/0345864 A1 11/2014 Winter et al.

FOREIGN PATENT DOCUMENTS

| | | | |
|---|---|---|---|
| CN | 101346324 | A | 1/2009 |
| CN | 102203211 | A | 9/2011 |
| CN | 102220126 | A | 10/2011 |
| CN | 104039920 | A | 9/2014 |
| DE | 10 2010 051 817 | A1 | 5/2012 |
| WO | WO 03/066704 | A1 | 8/2003 |
| WO | WO 2005/012393 | A1 | 2/2005 |
| WO | WO 2008/088449 | A2 | 7/2008 |
| WO | WO 2011/050046 | A1 | 4/2011 |
| WO | WO 2012/151109 | A1 | 11/2012 |
| WO | WO 2013/036350 | A1 | 3/2013 |
| WO | WO 2014/144516 | A1 | 9/2014 |
| WO | WO 2014/151294 | A1 | 9/2014 |

OTHER PUBLICATIONS

International Search Report for Application No. PCT/US2014/028960 dated May 27, 2014, 3 pages.
International Search Report for Application No. PCT/US2014/023270 dated Jun. 11, 2014, 3 pages.
International Search Report for Application No. PCT/US2014/025390 dated Jun. 11, 2014, 3 pages.

(Continued)

*Primary Examiner* — Jeffrey D Washville
(74) *Attorney, Agent, or Firm* — DLA Piper LLP (US)

(57) ABSTRACT

A proppant includes a particle present in an amount of from 90 to 99.5 percent by weight and a polymeric coating disposed about the particle and present in an amount of from 0.5 to 10 percent by weight, based on the total weight of the proppant. The polymeric coating includes the reaction product of an acrylate copolymer and an isocyanate. The acrylate copolymer includes styrene units and has a hydroxyl number of from 20 to 500 mg KOH/g. A method of forming the proppant includes the steps of combining the acrylate copolymer and the isocyanate to react and form the polymeric coating and coating the particle with the polymeric coating to form the proppant.

14 Claims, No Drawings

(56) References Cited

OTHER PUBLICATIONS

Arkema Inc., "Norsocryl", extracted from http://www.arkema.com/sites/group/en/products/detailed_sheets/acrylics on Jan. 18, 2013.
Arkema Inc., "Luperox Technical Information", May 2009, pp. 1-2.
BASF, "Acrodur 950 L Fiber Bonding Technical Data Sheet", Oct. 2009, pp. 1-3.
BASF, "Safety Data Sheet B-82", Jun. 25, 2007, pp. 1-6.
BASF, "Safety Data Sheet B-91", Dec. 8, 2011, pp. 1-7.
BASF, "Safety Data Sheet Joncryl 70", Apr. 9, 2007, pp. 1-6.
BASF, "Safety Data Sheet Joncryl 569", Mar. 29, 2007, pp. 1-6.
BASF, "Printing & Packaging Industrial Coatings Technical Data Sheet-Joncryl 690", Nov. 2010, pp. 1-3.
BASF, "Safety Data Sheet JPX-S028", Feb. 8, 2010, pp. 1-6.
BASF, "Luwipal 066 LF Technical Information", Apr. 2003, 4 pages.
BASF Corporation, Urethane Chemicals CASE Product Line, 2010, 1-11.
BASF Polyurethanes North America, "Pluracol CASE Polyols", 2011, 6 pages, downloaded from http://www.polyurethanes.basf.us/products/name/pluracol/pluracolcase.
BASF Corporation, "Pluracol TP Series", 2000, 1 page.
Chemical Book, "CAS Database: 141-32-2", extracted from http://www.chemicalbook.com/CASEN_141-32-2.htm on Jan. 18, 2013.
QVC Thermoset Specialties, "ERISYS GA-240 Technical Bulletin", Aug. 21, 2008, 1 page.
European Committee for Standardization, "Petroleum and Natural Gas Industries—Completion Fluids and Materials—Part 2: Measurement of Properties of Proppants Used in Hydraulic Fracturing and Gravel-Packing Operations—ISO 13503:2:2006," Nov. 2006, pp. 1-33.
Evonik Industries, "GPS Safety Summary", Version 1, Jun. 2013, pp. 1-5.
INEOS Products, "INEQS Melamines", extracted from http://www.ineos.com/Products on Mar. 13, 2014, 2 pages.
National Institute of Standards and Technology, "Hexa(methoxymethyl)melamine", extracted from http://webbook.nist.gov on Jan. 17, 2013, pp. 1-4.
Wamser, Dr. Carl C., "Organic Chemistry III—Chapter 23—Polymers", Portland State University, Chem 336, Spring 2000, pp. 1-23, extracted from http://web.pdx.edu/wamserc/C336S00/23notes.htm on Jan. 18, 2013.
English language abstract for CN 101346324 extracted from espacenet.com database on Jul. 27, 2017, 1 page.
English language abstract for CN 102203211 extracted from espacenet.com database on Jul. 27, 2017, 1 page.
English language abstract and machine-assisted English translation for CN 102220126 extracted from espacenet.com database on Jul. 27, 2017, 13 pages.
English language abstract for CN 104039920 extracted from espacenet.com database on Jul. 27, 2017, 2 pages.

* cited by examiner

PROPPANT

RELATED APPLICATIONS

This application is the National Stage of International Patent Application No. PCT/US2014/023270, filed on Mar. 11, 2014, which claims priority to and all the advantages of U.S. Patent Application No. 61/792,116, filed on Mar. 15, 2013, the contents of which are incorporated herein by reference.

FIELD OF THE DISCLOSURE

The subject disclosure generally relates to a proppant and a method of forming the proppant. More specifically, the subject disclosure relates to a proppant which includes a particle and a polymeric coating disposed on the particle, and which is used during hydraulic fracturing of a subterranean formation.

DESCRIPTION OF THE RELATED ART

Domestic energy needs in the United States currently outpace readily accessible energy resources, which has forced an increasing dependence on foreign petroleum fuels, such as oil and gas. At the same time, existing United States energy resources are significantly underutilized, in part due to inefficient oil and gas procurement methods and a deterioration in the quality of raw materials such as unrefined petroleum fuels.

Petroleum fuels are typically procured from subsurface reservoirs via a wellbore. Petroleum fuels are currently procured from low-permeability reservoirs through hydraulic fracturing of subterranean formations, such as bodies of rock having varying degrees of porosity and permeability. Hydraulic fracturing enhances production by creating fractures that emanate from the subsurface reservoir or wellbore, and provides increased flow channels for petroleum fuels. During hydraulic fracturing, specially-engineered carrier fluids are pumped at high pressure and velocity into the subsurface reservoir to cause fractures in the subterranean formations. A propping agent, i.e., a proppant, is mixed with the carrier fluids to keep the fractures open when hydraulic fracturing is complete. The proppant typically includes a particle and a coating disposed on the particle. The proppant remains in place in the fractures once the high pressure is removed, and thereby props open the fractures to enhance petroleum fuel flow into the wellbore. Consequently, the proppant increases procurement of petroleum fuel by creating a high-permeability, supported channel through which the petroleum fuel can flow.

However, many existing proppants exhibit inadequate thermal stability for high temperature and pressure applications, e.g. wellbores and subsurface reservoirs having temperatures greater than 21.1° C. (70° F.) and pressures, i.e., closure stresses, greater than 51.7 MPa (7,500 psi). As an example of a high temperature application, certain wellbores and subsurface reservoirs throughout the world have temperatures of about 190.6° C. (375° F.) and 282.2° C. (540° F.). As an example of a high pressure application, certain wellbores and subsurface reservoirs throughout the world have closure stresses that exceed 82.7 MPa (12,000 psi) or even 96.5 MPa (14,000 psi). As such, many existing proppants, which include coatings, have coatings such as epoxy or phenolic coatings, which melt, degrade, and/or shear off the particle in an uncontrolled manner when exposed to such high temperatures and pressures. Also, many existing proppants do not include active agents, such as microorganisms and catalysts, to improve the quality of the petroleum fuel recovered from the subsurface reservoir.

Further, many existing proppants include coatings having inadequate crush resistance. That is, many existing proppants include non-uniform coatings that include defects, such as gaps or indentations, which contribute to premature breakdown and/or failure of the coating. Since the coating typically provides a cushioning effect for the proppant and evenly distributes high pressures around the proppant, premature breakdown and/or failure of the coating undermines the crush resistance of the proppant. Crushed proppants cannot effectively prop open fractures and often contribute to impurities in unrefined petroleum fuels in the form of dust particles.

Moreover, many existing proppants also exhibit unpredictable consolidation patterns and suffer from inadequate permeability in wellbores, i.e., the extent to which the proppant allows the flow of petroleum fuels. That is, many existing proppants have a lower permeability and impede petroleum fuel flow. Further, many existing proppants consolidate into aggregated, near-solid, non-permeable proppant packs and prevent adequate flow and procurement of petroleum fuels from subsurface reservoirs.

Also, many existing proppants are not compatible with low-viscosity carrier fluids having viscosities of less than about 3,000 cps at 80° C. Low-viscosity carrier fluids are typically pumped into wellbores at higher pressures than high-viscosity carrier fluids to ensure proper fracturing of the subterranean formation. Consequently, many existing coatings fail mechanically, i.e., shear off the particle, when exposed to high pressures or react chemically with low-viscosity carrier fluids and degrade.

Finally, many existing proppants are coated via noneconomical coating processes and therefore contribute to increased production costs. That is, many existing proppants require multiple layers of coatings, which results in time-consuming and expensive coating processes.

Due to the inadequacies of existing proppants, there remains an opportunity to provide an improved proppant.

SUMMARY OF THE DISCLOSURE AND ADVANTAGES

The subject disclosure provides a proppant for hydraulically fracturing a subterranean formation. The proppant includes a particle present in an amount of from 90 to 99.5 percent by weight and a polymeric coating disposed about the particle and present in an amount of from 0.5 to 10 percent by weight, based on the total weight of the proppant. The polymeric coating includes the reaction product of an acrylate copolymer and an isocyanate. The acrylate copolymer includes styrene units and has a hydroxyl number of from 20 to 500 mg KOH/g.

A method of forming the proppant includes the steps of combining the acrylate copolymer and the isocyanate to react and form the polymeric coating and coating the particle with the polymeric coating to form the proppant.

Advantageously, the proppant of the subject disclosure improves upon the performance of existing proppants.

DETAILED DESCRIPTION OF THE DISCLOSURE

The subject disclosure includes a proppant, a method of forming, or preparing, the proppant, a method of hydraulically fracturing a subterranean formation, and a method of filtering a fluid. The proppant is typically used, in conjunction with a carrier fluid, to hydraulically fracture the subterranean formation which defines a subsurface reservoir (e.g. a wellbore or reservoir itself). Here, the proppant props open the fractures in the subterranean formation after the hydraulic fracturing. In one embodiment, the proppant may also be used to filter unrefined petroleum fuels, e.g. crude oil, in fractures to improve feedstock quality for refineries. However, it is to be appreciated that the proppant of the subject disclosure can also have applications beyond hydraulic fracturing and crude oil filtration, including, but not limited to, water filtration and artificial turf.

The proppant includes a particle and a polymeric coating disposed on the particle. As used herein, the terminology "disposed on" encompasses the polymeric coating being disposed about the particle and also encompasses both partial and complete covering of the particle by the polymeric coating. The polymeric coating is disposed on the particle to an extent sufficient to change the properties of the particle, e.g. to form a particle having a polymeric coating thereon which can be effectively used as a proppant. As such, any given sample of the proppant typically includes particles having the polymeric coating disposed thereon, and the polymeric coating is typically disposed on a large enough surface area of each individual particle so that the sample of the proppant can effectively prop open fractures in the subterranean formation during and after the hydraulic fracturing, filter crude oil, etc. The polymeric coating is described additionally below.

Although the particle may be of any size, the particle typically has a particle size distribution of from 10 to 100 mesh, alternatively from 20 to 70 mesh, as measured in accordance with standard sizing techniques using the United States Sieve Series. That is, the particle typically has a particle size of from 149 to 2,000, alternatively from 210 to 841, μm. Particles having such particle sizes allow less polymeric coating to be used, allow the polymeric coating to be applied to the particle at a lower viscosity, and allow the polymeric coating to be disposed on the particle with increased uniformity and completeness as compared to particles having other particle sizes.

Although the shape of the particle is not critical, particles having a spherical shape typically impart a smaller increase in viscosity to a hydraulic fracturing composition than particles having other shapes, as set forth in more detail below. The hydraulic fracturing composition is a mixture comprising the carrier fluid and the proppant. Typically, the particle is either round or roughly spherical.

The particle is present in the proppant in an amount of from 90 to 99.5, alternatively from 94 to 99.3, alternatively from 94 to 99, alternatively from 96 to 99, percent by weight based on the total weight of the proppant. The amount of particle present in the proppant may vary outside of the ranges above, but is typically both whole and fractional values within these ranges.

The particle typically contains less than 1 percent by weight of moisture, based on the total weight of the particle. Particles containing higher than 1 percent by weight of moisture typically interfere with sizing techniques and prevent uniform coating of the particle.

Suitable particles for purposes of the subject disclosure include any known particle for use during hydraulic fracturing, water filtration, or artificial turf preparation. Non-limiting examples of suitable particles include minerals, ceramics such as sintered ceramic particles, sands, nut shells, gravels, mine tailings, coal ashes, rocks (such as bauxite), smelter slag, diatomaceous earth, crushed charcoals, micas, sawdust, wood chips, resinous particles, polymeric particles, and combinations thereof. It is to be appreciated that other particles not recited herein may also be suitable for the purposes of the subject disclosure.

Sand is a preferred particle and when applied in this technology is commonly referred to as frac, or fracturing, sand. Examples of suitable sands include, but are not limited to, Badger sand, Brady sand, Northern White sand, Ottawa sand, and Texas Hickory sand. Based on cost and availability, inorganic materials such as sand and sintered ceramic particles are typically favored for applications not requiring filtration.

A specific example of a sand that is suitable as a particle for the purposes of the subject disclosure is Ottawa sand, commercially available from U.S. Silica Company of Berkeley Springs, W. Va. Yet another specific example of a sand that is suitable as a particle for the purposes of this disclosure is Wisconsin sand, commercially available from Badger Mining Corporation of Berlin, Wis. Particularly preferred sands for application in this disclosure are Ottawa and Wisconsin sands. Ottawa and Wisconsin sands of various sizes, such as 30/50, 20/40, 40/70, and 70/140 can be used.

Specific examples of suitable sintered ceramic particles include, but are not limited to, aluminum oxide, silica, bauxite, and combinations thereof. The sintered ceramic particle may also include clay-like binders.

An active agent may also be included in the particle. In this context, suitable active agents include, but are not limited to, organic compounds, microorganisms, and catalysts. Specific examples of microorganisms include, but are not limited to, anaerobic microorganisms, aerobic microorganisms, and combinations thereof. A suitable microorganism for the purposes of the subject disclosure is commercially available from LUCA Technologies of Golden, Colo. Specific examples of suitable catalysts include fluid catalytic cracking catalysts, hydroprocessing catalysts, and combinations thereof. Fluid catalytic cracking catalysts are typically selected for applications requiring petroleum gas and/or gasoline production from crude oil. Hydroprocessing catalysts are typically selected for applications requiring gasoline and/or kerosene production from crude oil. It is also to be appreciated that other catalysts, organic or inorganic, not recited herein may also be suitable for the purposes of the subject disclosure.

Such additional active agents are typically favored for applications requiring filtration. As one example, sands and sintered ceramic particles are typically useful as a particle for support and propping open fractures in the subterranean formation which defines the subsurface reservoir, and, as an active agent, microorganisms and catalysts are typically useful for removing impurities from crude oil or water. Therefore, a combination of sands/sintered ceramic particles and microorganisms/catalysts as active agents are particularly preferred for crude oil or water filtration.

Suitable particles for purposes of the present disclosure may even be formed from resins and polymers. Specific examples of resins and polymers for the particle include, but are not limited to, polyurethanes, polycarbodiimides, polyureas, acrylics, polyvinylpyrrolidones, acrrylonitrile-butadiene styrenes, polystyrenes, polyvinyl chlorides, fluoroplastics, polysulfides, nylon, polyamide imides, and combinations thereof.

As indicated above, the proppant includes the polymeric coating disposed on the particle. The polymeric coating is selected based on the desired properties and expected operating conditions of the proppant. The polymeric coating may provide the particle with protection from operating temperatures and pressures in the subterranean formation and/or subsurface reservoir. Further, the polymeric coating may protect the particle against closure stresses exerted by the subterranean formation. The polymeric coating may also protect the particle from ambient conditions and minimizes disintegration and/or dusting of the particle. In some embodiments, the polymeric coating may also provide the proppant with desired chemical reactivity and/or filtration capability.

The polymeric coating includes the reaction product of an acrylate copolymer ("the copolymer") and an isocyanate. The polymeric coating is formulated such that the physical properties of the polymeric coating, such as hardness, strength, toughness, creep, and brittleness are optimized.

The copolymer includes both styrene and acrylate units. As is known in the art, a polymer is formed from many "mers" or units. Throughout this disclosure, the use of the term unit is used to describe a unit formed from a particular monomer. For example, a 2-ethylhexyl acrylate unit within a polymer chain which is formed from 2-ethylhexyl acrylate. Further, the copolymer is described as including various percent by weight units, as used throughout this disclosure, percent by weight units refers to percent by weight units, based on the total weight of the copolymer.

The copolymer can include any styrene unit known in the art. The styrene units of the copolymer are typically selected from the group of styrene units, α-methylstyrene units, and combinations thereof. Of course, the examples of styrene units set forth above are non-limiting examples of styrene units which can be included in the copolymer.

The copolymer can include any acrylate unit known in the art. Of course, the copolymer can include one or more different acrylate units. As used herein, acrylate refers to both acrylates and methacrylates (the salts and esters of methacrylic acid). The copolymer typically includes one or more acrylate units. The copolymer typically includes isocyanate-reactive functional groups, e.g. hydroxy-functional groups, amine-functional groups, and combinations thereof. For purposes of the subject disclosure, an isocyanate-reactive functional group is any functional group that is reactive with at least one of the isocyanate groups of the isocyanate.

The acrylate units are typically selected from the group of methacrylate units, methyl methacrylate units, ethyl methacrylate units, butyl methacrylate units, propyl methacrylate units, methacrylic acid units, acrylic acid units, hydroxyethyl methacrylate units, glycidyl methacrylate units, 2-ethylhexyl acrylate units, and combinations thereof. The examples of acrylate units set forth above are non-limiting examples of units which can be included in the copolymer.

The copolymer typically includes 10 to 70, alternatively from 20 to 60, alternatively from 20 to 40, percent by weight styrene units. The copolymer can include from 5 to 50, alternatively 15 to 40 percent by weight hydroxyethyl methacrylate units. The copolymer can also include 5 to 60, alternatively 10 to 40, percent by weight 2-ethylhexyl acrylate units. The copolymer can also include methyl methacrylate and/or butyl methacrylate units.

The copolymer is typically hydroxy functional. Specifically, the copolymer typically has a hydroxyl number of from 20 to 500 mg, alternatively from 50 to 200, alternatively from 90 to 150, mg KOH/g. Alternatively, instead of a hydroxy functional copolymer, an acid functional copolymer which has an acid value of from 20 to 500 mg, alternatively from 20 to 300, alternatively from 50 to 250, mg KOH/g may be used.

The copolymer typically has a $T_g$ of from −10 to 60 (14-140), alternatively from 25 to 60 (77-140), ° C. (° F.).

In a preferred embodiment, the copolymer includes:

(a) 10 to 50, alternatively 20 to 40, alternatively 25 to 36, alternatively 33 to 36, percent by weight styrene units;

(b) 10 to 50, alternatively 20 to 35, alternatively 21 to 32, percent by weight hydroxyethyl methacrylate units; and (c) 5 to 40, alternatively 10 to 35, alternatively 12 to 21, percent by weight 2-ethylhexyl acrylate units.

In this embodiment, methacrylate units (b) are selected from the group of methyl methacrylate units, ethyl methacrylate units, butyl methacrylate units, propyl methacrylate units, methacrylic acid, hydroxyethyl methacrylate units, glycidyl methacrylate, and combinations thereof.

In one embodiment, the copolymer is a hydroxylated styrene acrylate copolymer having a hydroxyl number of 125 to 175 mg KOH/g and comprising 30 to 40 percent by weight styrene units, 30 to 40 percent by weight hydroxyethyl methacrylate units, 15 to 25 percent by weight methyl methacrylate units, and 5 to 15 percent by weight 2-ethylhexyl acrylate units, based on 100 percent by weight of the units present in the copolymer. In this particular embodiment, the copolymer has a number average molecular weight ($M_n$) of from 3,000 to 4,000 g/mol and a $T_g$ of from 20 to 30° C. (68 to 86° F.).

In another embodiment, the copolymer is a hydroxylated styrene acrylate copolymer having a hydroxyl number of from 75 to 125 mg KOH/g and comprising 20 to 30 percent by weight styrene units, 15 to 25 percent by weight hydroxyethyl methacrylate units, 20 to 30 percent by weight butyl methacrylate units, and 15 to 25 percent by weight 2-ethylhexyl acrylate units, based on 100 percent by weight of the units present in the copolymer. In this particular embodiment, the copolymer has a number average molecular weight ($M_n$) of from 15,000 to 18,000 g/mol and a $T_g$ of from 50 to 60° C. (122 to 140° F.).

In another embodiment, the copolymer is a hydroxylated styrene acrylate copolymer having a hydroxyl number of from 120 to 160 mg KOH/g and comprising 30 to 40 percent by weight styrene units, 30 to 40 percent by weight hydroxyethyl methacrylate units, and 30 to 40 percent by weight 2-ethylhexyl acrylate units, based on 100 percent by weight of the units present in the copolymer. In this particular embodiment, the copolymer has a number average molecular weight ($M_n$) of from 2,000 to 2,500 g/mol and a $T_g$ of from −10 to 0° C. (14 to 32° F.).

In yet another embodiment, the copolymer is an acid functional styrene acrylate copolymer instead of a hydroxyl functional copolymer. As one example, the copolymer of this embodiment is a styrene acrylate copolymer having an acid number of from 190 to 250 mg KOH/g and includes 50 to 60 percent by weight styrene units, 5 to 15 percent by weight alpha methyl styrene units, and 30 to 40 percent by weight acrylic acid units, based on 100 percent by weight of the units present in the copolymer. As another example, a styrene acrylate copolymer having an acid number of 50 to 150 mg KOH/g and comprising 20 to 30 percent by weight styrene units, 5 to 15 percent by weight acrylic acid units, 40 to 60 percent by weight methyl methacrylate units, and 10 to 20 percent by weight butyl methacrylate units, based on 100 percent by weight of the units present in the copolymer.

The copolymer is typically reacted, to form the polymeric coating, in an amount of from 0.3 to 8, alternatively from 0.5 to 5, alternatively from 0.9 to 3, percent by weight based on the total weight of the proppant. The amount of copolymer which is reacted to form the polymeric coating may vary outside of the ranges above, but is typically both whole and fractional values within these ranges. Further, it is to be appreciated that more than one copolymer may be reacted to form the polymeric coating, in which case the total amount of all copolymer reacted is within the above ranges.

The copolymer is reacted with an isocyanate. The isocyanate is typically selected such that physical properties of the polymeric coating, such as hardness, strength, toughness, creep, and brittleness are optimized. The isocyanate may be a polyisocyanate having two or more functional groups, e.g. two or more NCO functional groups. Suitable isocyanates for purposes of the present disclosure include, but are not limited to, aliphatic and aromatic isocyanates. In various embodiments, the isocyanate is selected from the group of diphenylmethane diisocyanates (MDIs), polymeric diphenylmethane diisocyanates (pMDIs), toluene diisocyanates (TDIs), hexamethylene diisocyanates (HDIs), isophorone diisocyanates (IPDIs), and combinations thereof.

The isocyanate may be an isocyanate prepolymer. The isocyanate prepolymer is typically a reaction product of an isocyanate and a polyol and/or a polyamine. The isocyanate used in the prepolymer can be any isocyanate as described above. The polyol used to form the prepolymer is typically selected from the group of ethylene glycol, diethylene glycol, propylene glycol, dipropylene glycol, butane diol, glycerol, trimethylolpropane, triethanolamine, pentaerythritol, sorbitol, biopolyols, and combinations thereof. The polyamine used to form the prepolymer is typically selected from the group of ethylene diamine, toluene diamine, diaminodiphenylmethane and polymethylene polyphenylene polyamines, aminoalcohols, and combinations thereof. Examples of suitable aminoalcohols include ethanolamine, diethanolamine, triethanolamine, and combinations thereof.

Specific isocyanates that may be used to prepare the polymeric coating include, but are not limited to, toluene diisocyanate; 4,4'-diphenylmethane diisocyanate; m-phenylene diisocyanate; 1,5-naphthalene diisocyanate; 4-chloro-1; 3-phenylene diisocyanate; tetramethylene diisocyanate; hexamethylene diisocyanate; 1,4-dicyclohexyl diisocyanate; 1,4-cyclohexyl diisocyanate, 2,4,6-toluylene triisocyanate, 1,3-diisopropylphenylene-2,4-dissocyanate; 1-methyl-3,5-diethylphenylene-2,4-diisocyanate; 1,3,5-triethylphenylene-2,4-diisocyanate; 1,3,5-triisoproply-phenylene-2,4-diisocyanate; 3,3'-diethyl-bisphenyl-4,4'-diisocyanate; 3,5,3',5'-tetraethyl-diphenylmethane-4,4'-diisocyanate; 3,5,3',5'-tetraisopropyldiphenylmethane-4,4'-diisocyanate; 1-ethyl-4-ethoxy-phenyl-2,5-diisocyanate; 1,3,5-triethyl benzene-2,4,6-triisocyanate; 1-ethyl-3,5-diisopropyl benzene-2,4,6-triisocyanate and 1,3,5-triisopropyl benzene-2,4,6-triisocyanate. Other suitable polymeric coatings can also be prepared from aromatic diisocyanates or isocyanates having one or two aryl, alkyl, arakyl or alkoxy substituents wherein at least one of these substituents has at least two carbon atoms. Specific examples of suitable isocyanates include LUPRANATE® L5120, LUPRANATE® M, LUPRANATE® ME, LUPRANATE® MI, LUPRANATE® M20, and LUPRANATE® M70, all commercially available from BASF Corporation of Florham Park, N.J.

In one embodiment, the isocyanate is a polymeric isocyanate, such as LUPRANATE® M20. LUPRANATE® M20 includes polymeric diphenylmethane diisocyanate and has an NCO content of 31.5 weight percent.

The isocyanate is typically reacted, to form the polymeric coating, in an amount of from 0.3 to 8, alternatively from 0.5 to 5, alternatively from 0.9 to 3, parts by weight based on 100 parts by weight of the components used to form the proppant. The amount of isocyanate which is reacted to form the polymeric coating may vary outside of the ranges above, but is typically both whole and fractional values within these ranges. Further, it is to be appreciated that more than one isocyanate may be reacted to form the polymeric coating, in which case the total amount of all isocyanates reacted is within the above ranges.

The copolymer may be reacted with the isocyanate in the presence of the catalyst to form the polymeric coating. The catalyst may include any suitable catalyst or mixtures of catalysts known in the art which catalyze the reaction between the copolymer and the isocyanate. Generally, the catalyst is selected from the group of amine catalysts, phosphorous compounds, basic metal compounds, carboxylic acid metal salts, non-basic organo-metallic compounds, and combinations thereof. The catalyst is typically present in an amount of from 0.1 to 5, alternatively from 0.15 to 3, alternatively from 0.2 to 2, parts by weight, based on 100 parts by weight of all the components reacted to form the polymeric coating. The amount of catalyst present may vary outside of the ranges above, but is typically both whole and fractional values within these ranges. Further, it is to be appreciated that more than one catalyst may be present, in which case the total amount of all catalysts reacted is within the above ranges.

The polymeric coating may include the reaction product of the copolymer, the isocyanate, and a tertiary amine. The tertiary amine may include epoxy functionality, with one such non-limiting example being tetra-glycidyl m-xylene diamine. The tertiary amine may be a melamine, on such non-limiting example being hexamethoxymethyl melamine.

The polymeric coating may also include an antistatic component. The antistatic component includes one or more antistatic compounds or antistats. The antistat reduces, removes, and prevents the buildup of static electricity on the proppant. The antistat can be a non-ionic antistat or an ionic or amphoteric antistat (which can be further classified as anionic or cationic). Ionic antistats are compounds that include at least one ion, i.e., an atom or molecule in which the total number of electrons is not equal to the total number of protons, giving it a net positive or negative electrical charge. Non-ionic antistats are organic compounds composed of both a hydrophilic and a hydrophobic portion. Of course, the antistatic component can include a combination of ionic and non-ionic antistats.

One suitable antistatic component is a quaternary ammonium compound. The quaternary ammonium compound includes a quaternary ammonium cation, often referred to as a quat. Quats are positively charged polyatomic ions of the structure $NR_4$+, R being an alkyl group or an aryl group. Unlike the ammonium ion ($NH_4$+) and the primary, secondary, or tertiary ammonium cations, quats are permanently charged, independent of the pH of their solution.

One such quaternary ammonium compound is dicocoyl ethyl hydroxyethylmonium methosulfate. Dicocoyl ethyl hydroxyethylmonium methosulfate is the reaction product of triethanol amine, fatty acids, and methosulfate.

Notably, dicocoyl ethyl hydroxyethylmonium methosulfate is a cationic antistat having a cationic-active matter content of 74 to 79 percent when tested in accordance with International Organization for Standardization ("ISO") 2871-1:2010. ISO 2871 specifies a method for the determination of the cationic-active matter content of high-molecular-mass cationic-active materials such as quaternary ammonium compounds in which two of the alkyl groups each contain 10 or more carbon atoms, e.g. distearyl-dimethyl-ammonium chlorides, or salts of imidazoline or 3-methyl-imidazoline in which long-chain acylaminoethyl and alkyl groups are substituted in the 1- and 2-positions, respectively.

Dicocoyl ethyl hydroxyethylmonium methosulfate has an acid value of not greater than 12 when tested in accordance with ISO 4314-1977 (Surface active agents—Determination of free alkalinity or free acidity—Titrimetric method) and a pH of from 2.5 to 3 when tested in accordance with ISO 4316:1977 (Determination of pH of aqueous solutions—Potentiometric method).

In addition to the quaternary ammonium compound, e.g. dicocoyl ethyl hydroxyethylmonium methosulfate, the antistatic component may further include a solvent, such as propylene glycol. In one such embodiment, the antistatic component includes mixture of dicocoyl ethyl hydroxyethylmonium methosulfate and propylene glycol.

The quaternary ammonium compound can be included in the polymeric coating or applied to the proppant in an amount of from 50 to 1000, alternatively from 100 to 500, PPM (PPM by weight particle, i.e., 100 grams of particle× 200 PPM surface treatment equals 0.02 grams of surface treatment per 100 grams of particle. The amount of the quaternary ammonium compound present in the surface treatment may vary outside of the ranges above, but is typically both whole and fractional values within these ranges.

The polymeric coating may also include a silicon-containing adhesion promoter. This silicon-containing adhesion promoter is also commonly referred to in the art as a coupling agent or as a binder agent. The silicon-containing adhesion promoter binds the polymeric coating to the particle. More specifically, the silicon-containing adhesion promoter typically has organofunctional silane groups to improve adhesion of the polymeric coating to the particle. Without being bound by theory, it is thought that the silicon-containing adhesion promoter allows for covalent bonding between the particle and the polymeric coating. In one embodiment, the surface of the particle is activated with the silicon-containing adhesion promoter by applying the silicon-containing adhesion promoter to the particle prior to coating the particle with the polymeric coating. In this embodiment, the silicon-containing adhesion promoter can be applied to the particle by a wide variety of application techniques including, but not limited to, spraying, dipping the particles in the polymeric coating, etc. In another embodiment, the silicon-containing adhesion promoter may be added to a component such as the copolymer or the isocyanate. As such, the particle is then simply exposed to the silicon-containing adhesion promoter when the polymeric coating is applied to the particle. The silicon-containing adhesion promoter is useful for applications requiring excellent adhesion of the polymeric coating to the particle, for example, in applications where the proppant is subjected to shear forces in an aqueous environment. Use of the silicon-containing adhesion promoter provides adhesion of the polymeric coating to the particle such that the polymeric coating will remain adhered to the surface of the particle even if the proppant, including the polymeric coating, the particle, or both, fractures due to closure stress.

Examples of suitable adhesion promoters, which are silicon-containing, include, but are not limited to, glycidoxypropyltrimethoxysilane, aminoethylaminopropyltrimethoxysilane, methacryloxypropyltrimethoxysilane, gamma-aminopropyltriethoxysilane, vinylbenzylaminoethylaminopropyltrimethoxysilane, glycidoxypropylmethyldiethoxysilane, chloropropyltrimethoxysilane, phenyltrimethoxysilane, vinyltriethoxysilane, tetraethoxysilane, methyldimethoxysilane, bis-triethoxysilylpropyldisulfidosilane, bis-triethoxysilylpropyltetrasulfidosilane, phenyltriethoxysilane, aminosilanes, and combinations thereof.

Specific examples of suitable silicon-containing adhesion promoters include, but are not limited to, SILQUEST™ A1100, SILQUEST™ A1110, SILQUEST™ A1120, SILQUEST™ 1130, SILQUEST™ A1170, SILQUEST™ A-189, and SILQUEST™ Y9669, all commercially available from Momentive Performance Materials of Albany, N.Y. A particularly suitable silicon-containing adhesion promoter is SILQUEST™ A1100, i.e., gamma-aminopropyltriethoxysilane. The silicon-containing adhesion promoter may be present in the proppant in an amount of from 0.001 to 5, alternatively from 0.01 to 2, alternatively from 0.02 to 1.25, percent by weight based on the total weight of the proppant. The amount silicon-containing adhesion promoter present in the proppant may vary outside of the ranges above, but is typically both whole and fractional values within these ranges.

The polymeric coating may also include a wetting agent. The wetting agent is also commonly referred to in the art as a surfactant. The proppant may include more than one wetting agent. The wetting agent may include any suitable wetting agent or mixtures of wetting agents known in the art. The wetting agent is employed to increase a surface area contact between the polymeric coating and the particle. In a typical embodiment, the wetting agent is added with a component such as the copolymer or the isocyanate. In another embodiment, the surface of the particle is activated with the wetting agent by applying the wetting agent to the particle prior to coating the particle with the polymeric coating.

A suitable wetting agent is BYK® 310, a polyester modified poly-dimethyl-siloxane, commercially available from BYK Additives and Instruments of Wallingford, Conn. The wetting agent may be present in the proppant in an amount of from 0.01 to 10, alternatively from 0.02 to 5, alternatively from 0.02 to 0.04, percent by weight based on the total weight of the proppant. The amount of wetting agent present in the proppant may vary outside of the ranges above, but is typically both whole and fractional values within these ranges.

The polymeric coating of this disclosure may also include the active agent already described above in the context of the particle. In other words, the active agent may be included in the polymeric coating independent of the particle. Once again, suitable active agents include, but are not limited to organic compounds, microorganisms, catalysts, and salts. Non-limiting examples of suitable salts include sodium perboate and sodium persulfate.

The polymeric coating may also include various additives. Suitable additives include, but are not limited to, blowing agents, blocking agents, dyes, pigments, diluents, catalysts, solvents, specialized functional additives such as antioxidants, ultraviolet stabilizers, biocides, fire retardants, fragrances, and combinations of the group. For example, a pigment allows the polymeric coating to be visually evaluated for thickness and integrity and can provide various marketing advantages. Also, physical blowing agents and chemical blowing agents are typically selected for polymeric coatings requiring foaming. That is, in one embodiment, the coating may include a foam coating disposed on the particle. Again, it is to be understood that the terminology "disposed on" encompasses both partial and complete covering of the particle by the polymeric coating, a foam coating in this instance. The foam coating is typically useful for applications requiring enhanced contact between the proppant and crude oil. That is, the foam coating typically defines microchannels and increases a surface area for contact between crude oil and the catalyst and/or microorganism.

The polymeric coating is typically selected for applications requiring excellent coating stability and adhesion to the particle. Further, polymeric coating is typically selected based on the desired properties and expected operating conditions of a particular application. The polymeric coating is chemically and physically stable over a range of temperatures and does not typically melt, degrade, and/or shear off the particle in an uncontrolled manner when exposed to higher pressures and temperatures, e.g. pressures and temperatures greater than pressures and temperatures typically found on the earth's surface. As one example, the polymeric coating is particularly applicable when the proppant is exposed to significant pressure, compression and/or shear forces, and temperatures exceeding 200° C. (392° F.) in the subterranean formation and/or subsurface reservoir defined by the formation. The polymeric coating is generally viscous to solid nature, and depending on molecular weight. Any suitable polymeric coating may be used for the purposes of the subject disclosure.

The polymeric coating is present in the proppant in an amount of from 0.5 to 10, alternatively from 0.7 to 6, alternatively from 1 to 6, alternatively from 1 to 4, percent by weight based on the total weight of the proppant. The amount of polymeric coating present in the proppant may vary outside of the ranges above, but is typically both whole and fractional values within these ranges.

The polymeric coating may be formed in-situ where the polymeric coating is disposed on the particle during formation of the polymeric coating. Typically the components of the polymeric coating are combined with the particle and the polymeric coating is disposed on the particle.

However, in one embodiment a polymeric coating is formed and some time later applied to, e.g. mixed with, the particle and exposed to temperatures exceeding 100° C. (212° F.) to coat the particle and form the proppant. Advantageously, this embodiment allows the polymeric coating to be formed at a location designed to handle chemicals, under the control of personnel experienced in handling chemicals. Once formed, the polymeric coating can be transported to another location, applied to the particle, and heated. There are numerous logistical and practical advantages associated with this embodiment. For example, if the polymeric coating is being applied to the particle, e.g. frac sand, the polymeric coating may be applied immediately following the manufacturing of the frac sand, when the frac sand is already at elevated temperature, eliminating the need to reheat the polymeric coating and the frac sand, thereby reducing the amount of energy required to form the proppant.

In another embodiment, the copolymer and the isocyanate are reacted to form the polymeric coating in a solution. The solution includes a solvent such as acetone. The solution viscosity is controlled by stoichiometry, monofunctional reagents, and a polymer solids level. After the polymeric coating is formed in the solution, the solution is applied to the particle. The solvent evaporates leaving the polymeric coating disposed on the particle. Once the polymeric coating is disposed on the particle to form the proppant, the proppant can be heated to further crosslink the polymeric coating. Generally, the crosslinking, which occurs as a result of the heating, optimizes physical properties of the polymeric coating.

In yet another embodiment, the polymeric coating may also be further defined as controlled-release. That is, the polymeric coating may systematically dissolve, hydrolyze in a controlled manner, or physically expose the particle to the petroleum fuels in the subsurface reservoir. In one such embodiment, the polymeric coating typically gradually dissolves in a consistent manner over a pre-determined time period to decrease the thickness of the polymeric coating. This embodiment is especially useful for applications utilizing the active agent such as the microorganism and/or the catalyst. That is, the polymeric coating is typically controlled-release for applications requiring filtration of petroleum fuels or water.

The polymeric coating may exhibit excellent non-wettability in the presence of water, as measured in accordance with standard contact angle measurement methods known in the art. The polymeric coating may have a contact angle of greater than 90° and may be categorized as hydrophobic. Consequently, the proppant of such an embodiment can partially float in the subsurface reservoir and is typically useful for applications requiring foam coatings.

Further, the polymeric coating typically exhibits excellent hydrolytic resistance and will not lose strength and durability when exposed to water. Consequently, the proppant can be submerged in the subsurface reservoir and exposed to water and will maintain its strength and durability.

The polymeric coating can be cured/cross-linked prior to pumping of the proppant into the subsurface reservoir, or the polymeric coating can be curable/cross-linkable whereby the polymeric coating cures in the subsurface reservoir due to the conditions inherent therein. These concepts are described further below.

The proppant of the subject disclosure may include the particle encapsulated with a cured polymeric coating. The cured polymeric coating typically provides crush strength, or resistance, for the proppant and prevents agglomeration of the proppant. Since the cured polymeric coating is cured before the proppant is pumped into a subsurface reservoir, the proppant typically does not crush or agglomerate even under high pressure and temperature conditions.

Alternatively, the proppant of the subject disclosure may include the particle encapsulated with a curable polymeric coating. The curable polymeric coating typically consolidates and cures subsurface. The curable polymeric coating is typically not cross-linked, i.e., cured, or is partially cross-linked before the proppant is pumped into the subsurface reservoir. Instead, the curable polymeric coating typically cures under the high pressure and temperature conditions in the subsurface reservoir. Proppants comprising the particle encapsulated with the curable polymeric coating are often used for high pressure and temperature conditions.

Additionally, proppants comprising the particle encapsulated with the curable polymeric coating may be classified as curable proppants, subsurface-curable proppants and partially-curable proppants. Subsurface-curable proppants typically cure entirely in the subsurface reservoir, while partially-curable proppants are typically partially cured before being pumped into the subsurface reservoir. The partially-curable proppants then typically fully cure in the subsurface reservoir. The proppant of the subject disclosure can be either subsurface-curable or partially-curable.

Multiple layers of the polymeric coating can be applied to the particle to form the proppant. As such, the proppant of the subject disclosure can include a particle having a cross-linked polymeric coating disposed on the particle and a curable polymeric coating disposed on the cross-linked coating, and vice versa. Likewise, multiple layers of the polymeric coating, each individual layer having the same or different physical properties can be applied to the particle to form the proppant. In addition, the polymeric coating can be applied to the particle in combination with coatings of different materials such as polyurethane coatings, polycarbodiimide coatings, polyamide imide coatings, polyisocyanurate coatings, polyarcylate/methacrylate coatings, epoxy coatings, phenolic coatings, furan coatings, sodium silicate coatings, hybrid coatings, and other material coatings.

The polymeric coating typically exhibits excellent adhesion to inorganic substrates. That is, the polymer wets out and bonds with inorganic surfaces, such as the surface of a sand particle, which consists primarily of silicon dioxide. As such, when the particle of the proppant is a sand particle, the polymeric coating bonds well with the particle to form a proppant which is especially strong and durable.

The proppant of the subject disclosure exhibits excellent thermal stability for high temperature and pressure applications. The polymeric coating is typically stable at temperatures greater than 200 (392). The thermal stability of the polymeric coating is typically determined by thermal gravimetric analysis (TGA).

Further, the polymeric coating does not degrade or delaminate from the particle at pressures (even at the temperatures described in the preceding paragraph) of greater than 51.7 MPa (7,500 psi), alternatively greater than 68.9 MPa (10,000 psi), alternatively greater than 86.2 MPa (12,500 psi), alternatively greater than 103.4 MPa (15,000 psi). Said differently, the proppant of this disclosure does not typically suffer from failure of the polymeric coating due to shear or degradation when exposed to the temperatures and pressures set forth in the preceding two paragraphs.

Further, with the polymeric coating of this disclosure, the proppant typically exhibits excellent crush strength, also commonly referred to as crush resistance. With this crush strength, the polymeric coating of the proppant is uniform and is substantially free from defects, such as gaps or indentations, which often contribute to premature breakdown and/or failure of the polymeric coating. In particular, the proppant typically exhibits a crush strength of 15 percent or less maximum fines as measured in accordance with American Petroleum Institute (API) RP60 at pressures ranging from 51.7 MPa (7,500 psi) to 68.9 MPa (10,000 psi), when tested on a white 40/70 sand (e.g. Ottawa).

When 40/70 Ottawa sand is utilized as the particle, a typical crush strength associated with the proppant of this disclosure is 15 percent or less, alternatively 11 percent or less, alternatively 7 percent or less maximum fines as measured in accordance with API RP60 by compressing a proppant sample, which weighs 9.4 grams, in a test cylinder (having a diameter of 1.5 inches as specified in API RP60) for 2 minutes at 62.4 MPa (9,050 psi) and 23° C. (73° F.). After compression, percent fines and agglomeration are determined.

When 40/70 Ottawa sand is utilized as the particle, a typical crush strength associated with the proppant of this disclosure is 15 percent or less, alternatively 10 percent or less maximum fines as measured in accordance with API RP60 by compressing a proppant sample, which weighs 23.78 grams, 2 lb/ft$^2$ loading density, in a test cylinder (having a diameter of 1.5 inches as specified in API RP60) for 2 minutes at 68.9 MPa (10,000 psi), and 23° C. (73° F.). By comparison, uncoated 40/70 Ottawa sand has a crush strength of 21.7 percent fines under the same conditions. After compression, percent fines and agglomeration are determined.

The polymeric coating of this disclosure typically provides a cushioning effect for the proppant and evenly distributes high pressures, e.g. closure stresses, around the proppant. Therefore, the proppant of the subject disclosure effectively props open fractures and minimizes unwanted impurities in unrefined petroleum fuels in the form of dust particles.

Although customizable according to carrier fluid selection, the proppant typically has a bulk density of from 0.1 to 3.0, alternatively from 1.0 to 2.5, alternatively from 1.0 to 2.0, alternatively from 1.1 to 1.9. One skilled in the art typically selects the specific gravity of the proppant according to the specific gravity of the carrier fluid and whether it is desired that the proppant be lightweight or substantially neutrally buoyant in the selected carrier fluid. Further, depending on the non-wettability of the polymeric coating, the proppant of such an embodiment typically has an apparent density of from 2.0 to 3.0, alternatively from 2.3 to 2.7, g/cm$^3$ according to API Recommended Practices RP60 for testing proppants. It is believed that the non-wettability of the polymeric coating may contribute to flotation of the proppant depending on the selection of the carrier fluid in the wellbore.

Further, the proppant typically minimizes unpredictable consolidation. That is, the proppant only consolidates, if at all, in a predictable, desired manner according to carrier fluid selection and operating temperatures and pressures. Also, the proppant is typically compatible with low-viscosity carrier fluids having viscosities of less than 3,000 cps at 80° C. (176° F.) and is typically substantially free from mechanical failure and/or chemical degradation when exposed to the carrier fluids and high pressures. Finally, the proppant is typically coated via economical coating processes and typically does not require multiple coating layers, and therefore minimizes production costs.

As set forth above, the subject disclosure also provides the method of forming, or preparing, the proppant. For this method, the particle, the copolymer and the isocyanate are provided. As with all other components which may be used in the method of the subject disclosure (e.g. the particle), the copolymer and the isocyanate are just as described above with respect to the polymeric coating. The copolymer and the isocyanate are combined and react to form the polymeric coating and the particle is coated with the polymeric coating to form the proppant. The polymeric coating is not required to be formed prior to exposure of the particle to the individual components, i.e., the copolymer and the isocyanate.

That is, the copolymer and the isocyanate may be combined to form the polymeric coating simultaneous with the coating of the particle. Alternatively, as is indicated in certain embodiments below, the copolymer and the isocyanate may be combined to form the polymeric coating prior to the coating of the particle.

The step of combining the copolymer and the isocyanate is conducted at a first temperature. At the first temperature, the copolymer and the isocyanate react to form the polymeric coating. The first temperature is typically greater than 150 (302), alternatively from 150 (302) to 250 (482), alternatively from 160 (320) to 220 (428), ° C. (° F.).

The particle is coated with the polymeric coating to form the proppant. The polymeric coatings applied to the particle to coat the particle. The particle may optionally be heated to a temperature greater than 50° C. (122° F.) prior to or simultaneous with the step of coating the particle with the polymeric coating. If heated, a preferred temperature range for heating the particle is typically from 50 (122° F.) to 220° C. (428° F.). The particle may also optionally be pre-treated with a silicon-containing adhesion promoter prior to the step of coating the particle with the polymeric coating.

Various techniques can be used to coat the particle with the polymeric coating. These techniques include, but are not limited to, mixing, pan coating, fluidized-bed coating, co-extrusion, spraying, in-situ formation of the polymeric coating, and spinning disk encapsulation. The technique for applying the polymeric coating to the particle is selected according to cost, production efficiencies, and batch size.

In this method, the steps of combining the copolymer and the isocyanate and coating the particle with the polymeric coating to form the proppant are typically collectively conducted in 60 minutes or less, alternatively in 30 minutes or less, alternatively in 1 to 20 minutes.

Once coated, the proppant can be heated to a second temperature to further crosslink the polymeric coating. The further cross-linking optimizes physical properties of the polymeric coating as well as the performance of the proppant. Typically, the second temperature is greater than 150 (302), alternatively greater than 180 (356), ° C. (° F.). In one embodiment, the proppant is heated to the second temperature of 190° C. (374° F.) for 60 minutes. In another embodiment, the proppant is heated to the second temperature in the well bore. If the proppant is heated to a second temperature, the step of heating the proppant can be conducted simultaneous to the step of coating the particle with the polymeric coating or conducted after the step of coating the particle with the polymeric coating.

In one embodiment, the polymeric coating is disposed on the particle via mixing in a vessel, e.g. a reactor. In particular, the individual components of the proppant, e.g. the copolymer, the isocyanate, and the particle, are added to the vessel to form a reaction mixture. The components may be added in equal or unequal weight ratios. The reaction mixture is typically agitated at an agitator speed commensurate with the viscosities of the components. Further, the reaction mixture is typically heated at a temperature commensurate with the polymeric coating technology and batch size. It is to be appreciated that the technique of mixing may include adding components to the vessel sequentially or concurrently. Also, the components may be added to the vessel at various time intervals and/or temperatures.

In another embodiment, the polymeric coating is disposed on the particle via spraying. In particular, individual components of the polymeric coating are contacted in a spray device to form a coating mixture. The coating mixture is then sprayed onto the particle to form the proppant. Spraying the polymeric coating onto the particle typically results in a uniform, complete, and defect-free polymeric coating disposed on the particle. For example, the polymeric coating is typically even and unbroken. The polymeric coating also typically has adequate thickness and acceptable integrity, which allows for applications requiring controlled-release of the proppant in the fracture. Spraying also typically results in a thinner and more consistent polymeric coating disposed on the particle as compared to other techniques, and thus the proppant is coated economically. Spraying the particle even permits a continuous manufacturing process. Spray temperature is typically selected by one known in the art according to polymeric coating technology and ambient humidity conditions. The particle may also be heated to induce cross-linking of the polymeric coating. Further, one skilled in the art typically sprays the components of the polymeric coating at a viscosity commensurate with the viscosity of the components.

In another embodiment, the polymeric coating is disposed on the particle in-situ, i.e., in a reaction mixture comprising the components of the polymeric coating and the particle. In this embodiment, the polymeric coating is formed or partially formed as the polymeric coating is disposed on the particle. In-situ polymeric coating formation steps typically include providing each component of the polymeric coating, providing the particle, combining the components of the polymeric coating and the particle, and disposing the polymeric coating on the particle. In-situ formation of the polymeric coating typically allows for reduced production costs by way of fewer processing steps as compared to existing methods for forming a proppant.

The formed proppant is typically prepared according to the method as set forth above and stored in an offsite location before being pumped into the subterranean formation and the subsurface reservoir. As such, coating typically occurs offsite from the subterranean formation and subsurface reservoir. However, it is to be appreciated that the proppant may also be prepared just prior to being pumped into the subterranean formation and the subsurface reservoir. In this scenario, the proppant may be prepared with a portable coating apparatus at an onsite location of the subterranean formation and subsurface reservoir.

The proppant is useful for hydraulic fracturing of the subterranean formation to enhance recovery of petroleum and the like. In a typical hydraulic fracturing operation, a hydraulic fracturing composition, i.e., a mixture, comprising the carrier fluid, the proppant, and optionally various other components, is prepared. The carrier fluid is selected according to wellbore conditions and is mixed with the proppant to form the mixture which is the hydraulic fracturing composition. The carrier fluid can be a wide variety of fluids including, but not limited to, kerosene and water. Typically, the carrier fluid is water. Various other components which can be added to the mixture include, but are not limited to, guar, polysaccharides, and other components know to those skilled in the art.

The mixture is pumped into the subsurface reservoir, which may be the wellbore, to cause the subterranean formation to fracture. More specifically, hydraulic pressure is applied to introduce the hydraulic fracturing composition under pressure into the subsurface reservoir to create or enlarge fractures in the subterranean formation. When the hydraulic pressure is released, the proppant holds the fractures open, thereby enhancing the ability of the fractures to extract petroleum fuels or other subsurface fluids from the subsurface reservoir to the wellbore.

For the method of filtering a fluid, the proppant of the subject disclosure is provided according to the method of forming the proppant as set forth above. In one embodiment, the subsurface fluid can be unrefined petroleum or the like. However, it is to be appreciated that the method of the subject disclosure may include the filtering of other subsurface fluids not specifically recited herein, for example, air, water, or natural gas.

To filter the subsurface fluid, the fracture in the subsurface reservoir that contains the unrefined petroleum, e.g. unfiltered crude oil, is identified by methods known in the art of oil extraction. Unrefined petroleum is typically procured via a subsurface reservoir, such as a wellbore, and provided as feedstock to refineries for production of refined products such as petroleum gas, naphtha, gasoline, kerosene, gas oil, lubricating oil, heavy gas, and coke. However, crude oil that resides in subsurface reservoirs includes impurities such as sulfur, undesirable metal ions, tar, and high molecular weight hydrocarbons. Such impurities foul refinery equipment and lengthen refinery production cycles, and it is desirable to minimize such impurities to prevent breakdown of refinery equipment, minimize downtime of refinery equipment for maintenance and cleaning, and maximize efficiency of refinery processes. Therefore, filtering is desirable.

For the method of filtering, the hydraulic fracturing composition is pumped into the subsurface reservoir so that the hydraulic fracturing composition contacts the unfiltered crude oil. The hydraulic fracturing composition is typically pumped into the subsurface reservoir at a rate and pressure such that one or more fractures are formed in the subterranean formation. The pressure inside the fracture in the subterranean formation may be greater than 5,000, greater than 7,000, or even greater than 68.9 MPa (10,000 psi), and the temperature inside the fracture is typically greater than 21° C. (70° F.) and can be as high 191° C. (375° F.) depending on the particular subterranean formation and/or subsurface reservoir.

Although not required for filtering, the proppant can be a controlled-release proppant. With a controlled-release proppant, while the hydraulic fracturing composition is inside the fracture, the polymeric coating of the proppant typically dissolves in a controlled manner due to pressure, temperature, pH change, and/or dissolution in the carrier fluid in a controlled manner or the polymeric coating is disposed about the particle such that the particle is partially exposed to achieve a controlled-release. Complete dissolution of the polymeric coating depends on the thickness of the polymeric coating and the temperature and pressure inside the fracture, but typically occurs within 1 to 4 hours. It is to be understood that the terminology "complete dissolution" generally means that less than 1 percent of the coating remains disposed on or about the particle. The controlled-release allows a delayed exposure of the particle to crude oil in the fracture. In the embodiment where the particle includes the active agent, such as the microorganism or catalyst, the particle typically has reactive sites that must contact the fluid, e.g. the crude oil, in a controlled manner to filter or otherwise clean the fluid. If implemented, the controlled-release provides a gradual exposure of the reactive sites to the crude oil to protect the active sites from saturation. Similarly, the active agent is typically sensitive to immediate contact with free oxygen. The controlled-release provides the gradual exposure of the active agent to the crude oil to protect the active agent from saturation by free oxygen, especially when the active agent is a microorganism or catalyst.

To filter the fluid, the particle, which is substantially free of the polymeric coating after the controlled-release, contacts the subsurface fluid, e.g. the crude oil. It is to be understood that the terminology "substantially free" means that complete dissolution of the polymeric coating has occurred and, as defined above, less than 1 percent of the polymeric coating remains disposed on or about the particle. This terminology is commonly used interchangeably with the terminology "complete dissolution" as described above. In an embodiment where an active agent is utilized, upon contact with the fluid, the particle typically filters impurities such as sulfur, unwanted metal ions, tar, and high molecular weight hydrocarbons from the crude oil through biological digestion. As noted above, a combination of sands/sintered ceramic particles and microorganisms/catalysts are particularly useful for filtering crude oil to provide adequate support/propping and also to filter, i.e., to remove impurities. The proppant therefore typically filters crude oil by allowing the delayed exposure of the particle to the crude oil in the fracture.

The filtered crude oil is typically extracted from the subsurface reservoir via the fracture, or fractures, in the subterranean formation through methods known in the art of oil extraction. The filtered crude oil is typically provided to oil refineries as feedstock, and the particle typically remains in the fracture.

Alternatively, in a fracture that is nearing its end-of-life, e.g. a fracture that contains crude oil that cannot be economically extracted by current oil extraction methods, the particle may also be used to extract natural gas as the fluid from the fracture. The particle, particularly where an active agent is utilized, digests hydrocarbons by contacting the reactive sites of the particle and/or of the active agent with the fluid to convert the hydrocarbons in the fluid into propane or methane. The propane or methane is then typically harvested from the fracture in the subsurface reservoir through methods known in the art of natural gas extraction.

The following examples are meant to illustrate the disclosure and are not to be viewed in any way as limiting to the scope of the disclosure.

EXAMPLES

Examples 1 through 4 are proppants formed according to the subject disclosure comprising the polymeric coating disposed on the particle. Examples 1 through 4 are formed with the components and amounts set forth in Table 1 below.

To form Examples 1 through 4, the Particle is added to a first reaction vessel. The Copolymer and the Isocyanate, and, if included, any Additive(s) are hand mixed with a spatula in a second reaction vessel to form a reaction mixture. The reaction mixture is added to the first reaction vessel and mixed with the Particle to (1) uniformly coat the surface of, or wet out, the Particle with the reaction mixture and (2) polymerize the Copolymer and the Isocyanate, to form the proppant comprising the Particle and the polymeric coating formed thereon. Examples 1 through 4 are formed with specific processing parameters, which are also set forth in Table 1 below.

Examples 1 through 4 are tested for crush strength. The appropriate formula for determining percent fines is set forth in API RP60. The crush strength of Examples 1 through 4 are tested by compressing a proppant sample, which weighs 9.4 grams, in a test cylinder (having a diameter of 3.8 cm (1.5 in) as specified in API RP60) for 2 minutes at 62.4 MPa (9050 psi) and 23° C. (73° F.).

Agglomeration is an objective observation of a proppant sample, i.e., a particular Example, after crush strength testing as described above. The proppant sample is assigned a numerical ranking between 1 and 10. If the proppant sample agglomerates completely, it is ranked 10. If the proppant sample does not agglomerate, i.e., it falls out of the cylinder after crush test, it is rated 1.

The crush strength and agglomeration values for Examples 1 through 4 are also set forth in Table 1 below.

TABLE 1

| | Ex. 1 | Ex. 2 | Ex. 3 | Ex. 4 |
|---|---|---|---|---|
| Polymer Coating | | | | |
| Copolymer A (g) | 14.5 | — | — | — |
| Copolymer B (g) | — | 16.0 | — | — |
| Copolymer C (g) | — | — | 11.9 | — |
| Copolymer D (g) | — | — | — | 15.4 |
| Isocyanate (g) | 5.0 | 3.5 | 7.0 | 2.75 |
| Acetone (g) | 14.5 | 16.0 | — | — |
| Ammonium Hydroxide Solution (g) | — | — | 29.0 | 39.7 |
| Proppant | | | | |
| Particle (g) | 500.0 | 500.0 | 500.0 | 500.0 |
| Coating (g) | 17.5 | 17.5 | 27.5 | 17.5 |

TABLE 1-continued

| | Ex. 1 | Ex. 2 | Ex. 3 | Ex. 4 |
|---|---|---|---|---|
| Surface Treatment (ppm; ppm by weight sand, i.e., 100 grams of sand × 200 ppm ST level = 0.02 grams of ST) | 200 | 200 | 200 | 200 |
| Percent Coating (based on 100 parts by weight of the Particle) | 3.5 | 3.5 | 5.5 | 3.5 |
| Processing Parameters | | | | |
| Starting Particle Temperature (° C.) | 170° C. | 170° C. | 170° C. | 170° C. |
| Mix Temperature (° C.) | 170° C. | 170° C. | 170° C. | 170° C. |
| Mix Time (min) | 4 | 4 | 4 | 4 |
| Mixture Method | Hobart Mixer 640 rpm | Hobart Mixer 640 rpm | Hobart Mixer 640 rpm | Hobart Mixer 640 rpm |
| Physical Properties | | | | |
| Crush Strength (% Fines <40 sieve) | 6 | 10 | 21 | 19 |
| Agglomeration (1-10) | 1 | 1 | 7 | 7 |

Copolymer A is a hydroxylated styrene acrylate copolymer having a hydroxyl number of 145 mg KOH/g and comprising 36 percent by weight styrene units, 32 percent by weight hydroxyethyl methacrylate units, 20 percent by weight methyl methacrylate units, and 12 percent by weight 2-ethylhexyl acrylate units, based on 100 percent by weight based on the total weight of the copolymer and having a molecular weight ($M_n$) of about 3,500 g/mol.

Copolymer B is a hydroxylated styrene acrylate copolymer having a hydroxyl number of 92 mg KOH/g and comprising 25 percent by weight styrene units, 21 percent by weight hydroxyethyl methacrylate units, 25 percent by weight butyl methacrylate units, and 21 percent by weight 2-ethylhexyl acrylate units, based on the total weight of the copolymer and having a molecular weight ($M_n$) of about 16,500 g/mol.

Copolymer C is a styrene acrylate copolymer having an amine number of 240 mg KOH/g and comprising 54 percent styrene units, 7 percent alpha methyl styrene units, and 39 percent acrylate acid units, based on the total weight of the copolymer and having a viscosity at 25° C. of 1800 cps.

Copolymer D is a styrene acrylate copolymer having an amine number of 75 mg KOH/g and comprising 24 percent styrene units, 10 percent acrylic acid units, 51 percent methyl methacrylate units, and 15 percent butyl methacrylate units, based on the total weight of the copolymer and having a molecular weight ($M_n$) of about 15,628 g/mol.

Isocyanate is polymeric diphenylmethane diisocyanate having an NCO content of 31.4 weight percent, a nominal functionality of 2.7, and a viscosity at 25° C. of 200 cps.

Particle is Ottawa sand having a sieve size of 40/70 (US Sieve No.) or 0.420/0.210 (mm).

Surface Treatment is dicocoyl ethyl hydroxyethylmonium methosulfate.

Referring now to Table 1, the proppants of Examples 1 and 2 demonstrate excellent crush strength and agglomeration while comprising just 3.5 percent by weight polymeric coating, based on 100 parts by weight of the Particle.

In addition to exhibiting the crush strength set forth, the proppants of Examples 1 and 2 also demonstrated excellent processing characteristics. Specifically, Examples 1 and 2 did not agglomerate during or after the coating process and did not build static when handled after the coating process. Regarding static build, the proppants of Examples 1 and 2 did not accumulate static during sieving, i.e., did not stick to surfaces of sieve trays and other sieving apparatus—even without use of the Surface Treatment set forth in Table 1 above.

Loss on ignition testing was performed to determine thickness of the polymeric coating on various sizes of the Particle. The polymeric coating of Example 1 tended to deposit in greater amount on larger particles (greater than 0.30 mm diameter particles) and in less amount on smaller particles (0.30 to 0.21 mm diameter particles). The polymeric coating of Example 1 is formed from Copolymer A, which has a relatively low molecular weight (3,500 g/mol) and relatively high hydroxyl value (145 mg KOH/g). The polymeric coating of Example 2 tended to deposit in less amount on larger particles and in greater amount on smaller particles. The polymeric coating of Example 2 is formed from Copolymer B, which has a relatively high molecular weight (16,500 g/mol) and relatively low hydroxyl value (92 mg KOH/g). As such, the polymeric coating of the subject disclosure can be tailored to the size of the particle employed by use of copolymers having various hydroxyl values and molecular weights.

Referring now to Table 1, the proppants of Examples 3 and 4, which are formed with an acid functional copolymer, demonstrate less crush resistance than Examples 1 and 2 but nonetheless exhibit higher crush resistance than uncoated sand while comprising just 3.5 percent by weight polymeric coating, based on 100 parts by weight of the Particle.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

It is also to be understood that any ranges and subranges relied upon in describing various embodiments of the present disclosure independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present disclosure, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The present disclosure has been described in an illustrative manner, and it is to be understood that the terminology which has been used is intended to be in the nature of words of description rather than of limitation. Obviously, many modifications and variations of the present disclosure are possible in light of the above teachings. It is, therefore, to be understood that within the scope of the appended claims, the present disclosure may be practiced otherwise than as specifically described.

What is claimed is:

1. A proppant for hydraulically fracturing a subterranean formation, said proppant comprising:

A. a particle present in an amount of from 90 to 99.5 percent by weight based on the total weight of said proppant; and B. a polymeric coating disposed about said particle and present in an amount of from 1 to 4 percent by weight based on the total weight of said proppant, said polymeric coating comprising the reaction product of:

i. a hydroxylated styrene acrylate copolymer having a hydroxyl number of from 90 to 150 mg KOH/g and comprising 20 to 40 percent by weight styrene units, 21 to 32 percent by weight hydroxyethyl methacrylate units, and 12 to 21 percent by weight 2-ethylhexyl acrylate units; and ii. a diphenylmethane diisocyanate and/or a polymeric diphenylmethane diisocyanate.

2. A proppant as set forth in claim 1 wherein said acrylate copolymer comprises methacrylate units selected from the group of methyl methacrylate units, ethyl methacrylate units, butyl methacrylate units, propyl methacrylate units, methacrylic acid units, hydroxyethyl methacrylate units, glycidyl methacrylate units, and combinations thereof.

3. A proppant as set forth in claim 1 wherein said acrylate copolymer further comprises methyl methacrylate units and/or butyl methacrylate units.

4. A proppant as set forth in claim 1 wherein said polymeric coating is further defined as comprising the reaction product of said acrylate copolymer, said isocyanate, and a tertiary amine.

5. A proppant as set forth in claim 1 wherein said acrylate copolymer has a Tg of from −10 to 60° C. (14 to 140° F.).

6. A proppant as set forth in claim 1 wherein said particle is selected from the group of minerals, ceramics, sands, nut shells, gravels, mine tailings, coal ashes, rocks, smelter slag, diatomaceous earth, crushed charcoals, micas, sawdust, wood chips, resinous particles, polymeric particles, and combinations thereof.

7. A proppant as set forth in claim 1 having a crush strength of 11 percent or less maximum fines less than 0.425 mm (sieve size 40) as measured by compressing a 9.4 g sample of said proppant in a test cylinder having a diameter of 3.8 cm (1.5 in) for 2 minutes at 62.4 MPa (9050 psi) and 23° C. (73° F.) wherein said particle is 40/70 Ottawa sand.

8. A method of hydraulically fracturing a subterranean formation which defines a subsurface reservoir with a mixture comprising a carrier fluid and the proppant as set forth in claim 1, said method comprising the step of pumping the mixture into the subsurface reservoir to fracture the subterranean formation.

9. A method of forming a proppant as set forth in claim 1, said method comprising the steps of:

A. combining said acrylate copolymer and said polymeric diphenylmethane diisocyanate and/or said polymeric diphenylmethane diisocyanate to react and form the polymeric coating; and ii.

B. coating the particle with the polymeric coating to form the proppant.

10. A method as set forth in claim 9 wherein the step of combining is further defined as combining the copolymer and the isocyanate at a first temperature of greater than 150° C. (302° F.).

11. A method as set forth in claim 9 further comprising the step of heating the proppant to a second temperature greater than 150° C. (302° F.) after the step of coating the particle with the polymeric coating.

12. A method as set forth in claim 9 wherein the step of combining the copolymer and the isocyanate to react and form the polymeric coating is conducted simultaneous with the step of coating the particle with the polymeric coating to form the proppant and are also conducted in 60 minutes or less.

13. A method as set forth in claim 9 wherein the polymeric coating is further defined as comprising the reaction product of the acrylate copolymer, the isocyanate, and a tertiary amine.

14. A proppant as set forth in claim 1 wherein said acrylate copolymer further comprises 15 to 25 percent by weight of methyl methacrylate units or 20 to 30 butyl methacrylate units.

* * * * *